United States Patent [19]
Davidson et al.

[11] Patent Number: 5,630,136
[45] Date of Patent: May 13, 1997

[54] METHOD AND APPARATUS FOR SERIALIZING ACCESS TO MULTITHREADING UNSAFE RESOURCES

[75] Inventors: Andrew E. Davidson, Boulder Creek, Calif.; Maurice Balick, Fairhaven, Md.; Alan Snyder, Palo Alto, Calif.

[73] Assignee: Sun Microsystems, Inc., Mountain View, Calif.

[21] Appl. No.: 494,117

[22] Filed: Jun. 9, 1995

[51] Int. Cl.$^6$ ............................................. G06F 15/16
[52] U.S. Cl. .................. 395/676; 395/670; 395/677; 395/472
[58] Field of Search ..................... 395/700, 650, 395/670, 676, 677; 364/DIG. 1

[56] References Cited

U.S. PATENT DOCUMENTS 5,481,706  1/1996  Peek ........................................ 395/650
5,485,626  1/1996  Lawlor et al. ........................... 395/650

OTHER PUBLICATIONS

Dorfman, and Neuberger, "Effective Multi threading in OS/2®", McGraw–Hill, 1994, USA.

*Primary Examiner*—Kevin A. Kriess
*Assistant Examiner*—Majid A. Banankhah
*Attorney, Agent, or Firm*—Hickman Beyer & Weaver

[57] ABSTRACT

An improved technique for serializing access to multithreading unsafe resources is described. A baton manager is used to manage the serializing of accesses to a multithreading unsafe resource. For a thread to access the multithreading unsafe resource, the thread must first obtain a baton from the baton manager. Then, once the thread has finished accessing the multithreading unsafe resource, the thread releases the baton to the baton manager. Hence, by using the baton manager to manage the baton, accesses to multithreading unsafe resources are serialized while program crashes or deadlocks are minimized. The multithreading unsafe resource will typically have a plurality of baton objects associated therewith. The baton objects are objects of object-oriented programming. The baton manager will permit at most one of the baton objects for a given multithreading unsafe resource to own the baton at a time. The threads associated with the baton objects waiting to own the baton must wait until they receive the baton before they can access the multithreading unsafe resource.

27 Claims, 12 Drawing Sheets

```
main( ){
    .
    .
    obtain lock
12  unsafe Func_x( )
    FOO( )
              └→ BAR( )
10                      └→ obtain lock
                           unsafe Func_y( )
    release lock           release lock
    .
    .
}
```
FIG. 1
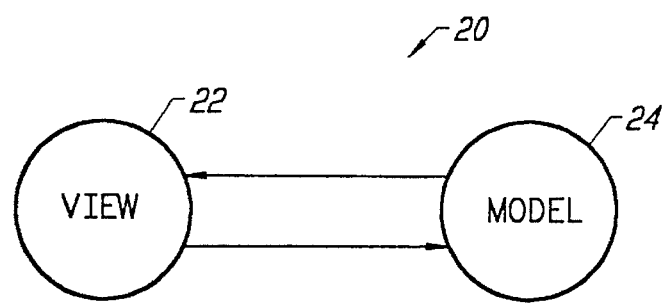
FIG. 2A
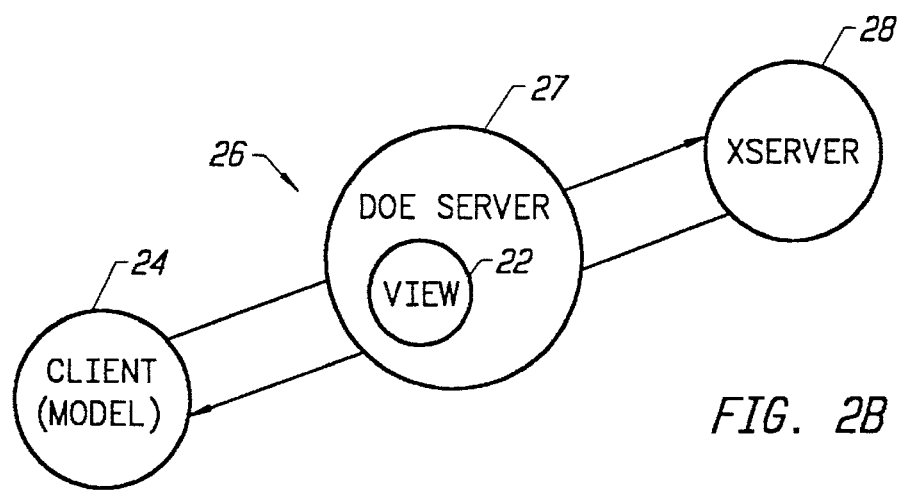
FIG. 2B

142 ⎯⎯  
THREAD #A  
(X_EVENT LOOP)

144 ⎯⎯  
THREAD #B  
(ADD x_CONNECTION)

BEGIN LOOP:
    GRAB BATON
    WHILE (EVENTS)
        GET NEXT EVENT
        DISPATCH NEXT EVENT
    ENDWHILE
150 ⎯⎯ RELEASE BATON
    OBTAIN CONNECTION_LIST_LOCK
    POLL CONNECTION_LIST
    } WAIT FOR EVENT ACTIVITY

146 ⎯⎯  
BEGIN:
    } WAIT FOR LOCK

RELEASE CONNECTION_LIST_LOCK
END LOOP

148 ⎯⎯ OBTAIN CONNECTION_LIST_LOC
    ADD CONNECTION TO CONNECTION_LIST
    RELEASE CONNECTION_LIST_LOCK
END

FIG. 13

METHOD AND APPARATUS FOR SERIALIZING ACCESS TO MULTITHREADING UNSAFE RESOURCES

BACKGROUND OF THE INVENTION

1. Field of the Invention

The present invention relates generally to multithreaded processes, and more particularly, to serializing access to multithreading unsafe resources.

2. Description of the Related Art

Many of today's computer systems and operating systems permit multitasking which allows many programs (known as processes) to run concurrently even when the computer system has only a single central-processing-unit (CPU). An important feature of multitasking is that each process has its own address space. Most computer systems and operating systems that support multitasking also support multithreading. Threads are like processes, but each thread must be associated with a process. Hence, with multithreading, each process can include multiple threads which share the same address space and stack area.

Modern programs make use of multithreading when developing programs or code for execution on computer systems and operating systems which support multithreading. However, there exists a large body of libraries, databases, toolkits, algorithms or other resources which these multithreaded applications would like to access, but have difficulty doing so because the resources do not support multithreading. The difficulty arises from the fact that multithreaded accesses to such resources would be unsafe because the results could not be guaranteed to be correct. Resources that do not support multithreading are called multithreading unsafe resources.

Prior approaches have attempted to serialize the multithreaded accesses by placing all such accesses into a single thread prior to accessing resources which are multithreading unsafe. Typically, the accesses are system calls or function calls. One approach is to permit accesses to multithreaded unsafe resources only from a main thread, and restricting all other threads from accessing the multithreaded unsafe resources. This approach is unsatisfactory because it places a difficult burden on the programmer to insure that all calls are carried out from a main thread. Another known approach is to serialize access to the multithreading unsafe resources using MUTEX (mutually exclusive) semaphores. Serializing access to a resource means that only one thread at a time can access the resource. A MUTEX semaphore provides a locking scheme that locks the resource while a thread owns the resource. The lock insures that all other threads are locked out from the resource, that is, unable to access the resource. The MUTEX lock approach is further discussed in *Effective Multithreading in OS/2*, by Len Dorfman and Marc J. Neuberger, McGraw-Hill, 1994.

FIG. 1 illustrates an example of the difficulties associated with serializing access to a multithreading unsafe resource. A process 10 shown in FIG. 1 uses a MUTEX lock to implement the serialization. The process 10 executes in a single thread and includes function calls to unsafe Func_x and unsafe Func_y. Prior to executing unsafe function call Func_x, an obtain lock command (obtainlock) is issued to obtain the MUTEX lock. The software developer places the obtain lock command in the code for the process so as to obtain the MUTEX lock for the resource which the process will soon call via unsafe Func_x. However, in this example, following the unsafe function call (unsafe Func_x), the function FOO is called, which in turns calls function BAR.

The function BAR contains an unsafe function call (unsafe Func_y). Hence, prior to the unsafe function call (unsafe Func_y) within function BAR, the software developer would (assuming the developer knows of the unsafe function call with function BAR) place an obtain lock command (obtainlock) so as to obtain the MUTEX lock for the resource. However, since the FOO function obtained the MUTEX lock earlier and has not yet released the MUTEX lock, a deadlock condition results and the process cannot continue. The problem in this example is that the developer did not release the MUTEX lock before again seeking to obtain the lock. To insure proper execution in this example, the developer should have placed a release lock command (releaselock) after the unsafe function call (unsafe Func_x) and before the function call to function FOO. The proper placement of the release lock command for this example is shown by reference number 12 in FIG. 1.

The problem with all of the prior approaches to serializing access to multithreading unsafe resources is that their implementations are very difficult. The burden on software developers to manage the serialization is too high. Further, the risk of mismanaging the serialization of the accesses can be disastrous, namely program crash or erroneous execution. In some cases, it is easier and less problematic to simply rewrite the code associated with the multithreading unsafe resources, than to implement one of the prior approaches.

Thus, there is a need for an improved technique to serialize access to multithreading unsafe resources which does not place a substantial burden on software developers.

SUMMARY OF THE INVENTION

Broadly speaking, the invention is an improved technique for serializing access to multithreading unsafe resources. The invention uses baton objects to manage the serializing of accesses to a multithreading unsafe resource. For a particular thread to access the multithreading unsafe resource, the baton object associated with the thread must first obtain a baton. Once the baton object associated with the thread obtains the baton, the thread is permitted to access the multithreading unsafe resource. Then, after the thread has finished accessing the multithreading unsafe resource, the baton object associated with the thread releases the baton. Each multithreading unsafe resource can have a plurality of baton objects associated therewith. The baton objects are objects of object-oriented programming. However, at most one of the baton objects for a given multithreading unsafe resource can own the baton at any given time. The threads associated with the baton objects waiting to own the baton must wait until they receive the baton before they can access the multithreading unsafe resource. By using the baton objects, accesses to multithreading unsafe resources are efficiently serialized and program crashes or deadlocks are minimized.

The invention can be implemented in numerous ways, including as a method, an apparatus and a computer program product.

A method according to the invention operates to synchronize multithreaded processes within a multitasking computer system so that the threads can safely access a multithreading unsafe resource. The method includes the operations of: creating a baton object for a multithreading unsafe resource; grabbing a baton by the baton object before calling the multithreading unsafe resource; subsequent to the grabbing, accessing the multithreading unsafe resource; and releasing the baton from the baton object once the accessing is completed. The baton object which grabs the baton is associated with the thread that seeks to access the multithreading unsafe resource. Preferably, the grabbing operation determines whether the baton for the multithreading unsafe resource is already held by the baton object and/or whether a baton object associated with the current thread holds the baton for the multithreading unsafe resource. Moreover, when the baton is neither held by the baton object nor held by a baton object associated with the current thread, the grabbing of the baton may further include the operations of: obtaining an access lock for the multithreading unsafe resource, setting a baton held flag for the baton object to indicate ownership of the baton, and storing an identifier for the current thread in a baton holder variable to indicate the thread holding the baton.

An apparatus according to the invention serializes access to a multithreading unsafe resource. The apparatus includes computer code having access requests to the multithreading unsafe resource, a computer system and an operating system which both support multithreading and cooperate to execute the computer code in a multithreaded manner, and a baton manager for serializing access of the multithreading unsafe resource by the computer system and the operating system during the execution of the computer code so that at any given point in time only a single thread accesses the multithreading unsafe resource. The baton manager uses at least one baton object to manage ownership of a mutually exclusive lock which insures that the accesses to the multithreading unsafe resource are serialized. Preferably, the baton manager manages multiple baton objects for the multithreading unsafe resource, with at most only one of the baton objects associated with the multithreading unsafe resource at ally given point in time owning the mutually exclusive lock during execution of the computer code. The apparatus call also use the baton to manage ownership of mutually exclusive locks for a plurality of multithreading unsafe resources.

A computer program product according to the invention includes a computer usable medium having computer readable code embodied therein for serializing access to multithreading unsafe resources. The computer readable code includes first computer readable program code devices configured to cause a computer to effect creating a baton object for a multithreading unsafe resource, second computer readable program code devices configured to cause a computer to effect grabbing a baton by the baton object before calling the multithreading unsafe resource, third computer readable program code devices configured to cause a computer to effect accessing the multithreading unsafe resource, and fourth computer readable program code devices configured to cause a computer to effect releasing the baton from the baton object after the accessing of the multithreading unsafe resource is complete. Preferably, the second computer readable program code devices would include computer readable program code devices to determine whether the baton object associated with the current thread holds the baton for the multithreading unsafe resource and to obtain the baton for the multithreading unsafe resource when the current thread does not hold the baton.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1 is a diagram illustrating an example of the difficulties associated with serializing access to a multithreading unsafe resource;

FIG. 2A is a diagram illustrating a basic graphical user interface process arrangement;

FIG. 2B is a diagram illustrating an arrangement of a distributed object-oriented environment (DOE) server together with a client process and an X_Server;

FIG. 13 is a diagram illustrating pseudo-code for an exemplary case of the baton X_event processing and the add X_connection processing;

DETAILED DESCRIPTION OF THE INVENTION

Figure 3:
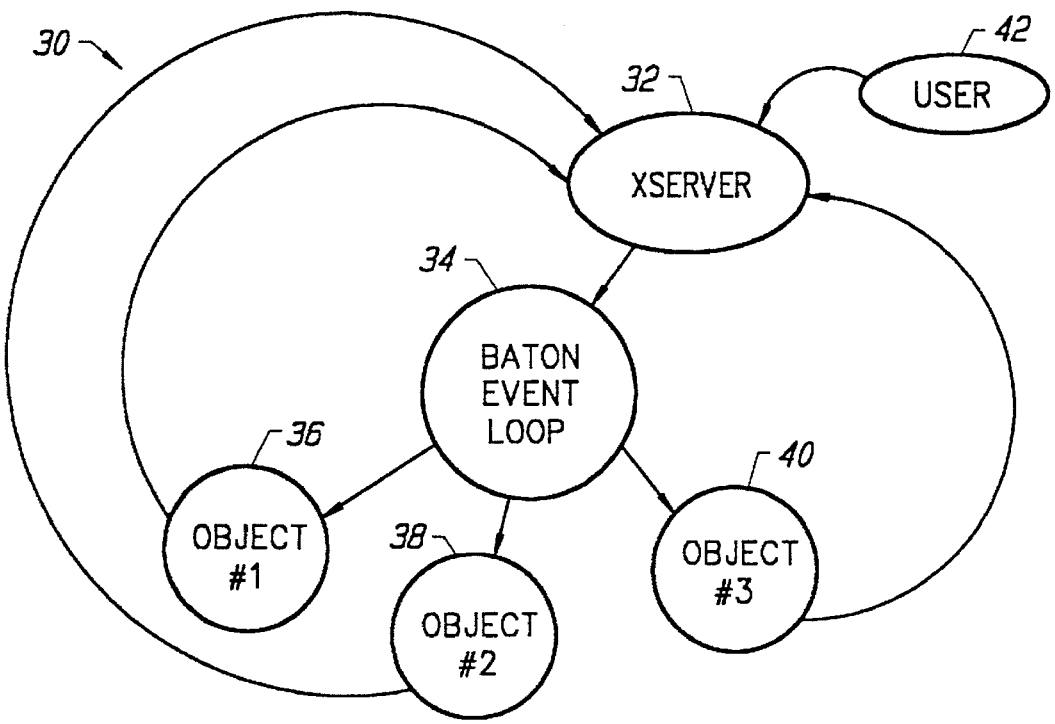
FIG. 3 is a diagram illustrating implementation of the invention in an X_Windows system.

Embodiments of the invention are discussed below with reference to FIGS. 2–15. However, those skilled in the art will readily appreciate that the detailed description given herein with respect to these figures is for explanatory purposes as the invention extends beyond these limited embodiments.

The invention uses baton objects to manage the serializing of accesses to a multithreading unsafe resource. For a particular thread to access the multithreading unsafe resource, the baton object associated with the thread must first obtain a baton. Once the baton object associated with the thread obtains the baton, the thread is permitted to access the multithreading unsafe resource. Then, after the thread has finished accessing the multithreading unsafe resource, the baton object associated with the thread releases the baton. Each multithreading unsafe resource can have a plurality of baton objects associated therewith. The baton objects are objects of object-oriented programming. However, at most one of the baton objects for a given multithreading unsafe resource can own the baton at any given time. The threads associated with the baton objects waiting to own the baton must wait until they receive the baton before they can access the multithreading unsafe resource. By using the baton objects, accesses to multithreading unsafe resources are efficiently serialized and program crashes or deadlocks are minimized.

Because of its object-oriented nature, the invention can be arranged or configured for any multithreading environment.

FIGS. 2A and 2B illustrate two of many possible arrangements, configurations or situations in which the invention would be useful. FIG. 2A is an example of a situation in which the invention allows a multithreaded program to be used with a multithreading unsafe program without the multithreaded program having to understand the details of the construction or operation of the multithreading unsafe program. FIG. 2B is an example of a situation in which the invention is used by a multitasking computer system and operating system to serialize accesses to multithreading unsafe resources.

FIG. 2A is a diagram illustrating a basic graphical user interface (GUI) process arrangement 20. The process arrangement 20 includes a view object 22 and a model object 24. The view object 22 is a multithreading unsafe resource which is responsible for presentation of results and other information from the model object 24 on a computer display. In this embodiment, the multithreading unsafe resource is a GUI program. The GUI program could, for example, be MOTIF because MOTIF does not support multithreading.

In order to have the view object 22 appear very responsive to a user, each call between the view object 22 and the model object 24 would be placed in separate threads. The distributed object-oriented environment (DOE) developed by Sun Microsystems, Inc. is an example of an operating system which utilizes such multithreading. When the computer system and the operating system support multithreading and the view object 22 is multithreading unsafe, a MUTEX lock must insure that accesses to the view object 22 are mutually exclusive, that is, serial. Without some sort of serialization, calls from the model object 24 to the view object 22 will not execute properly in the view object 22. However, using the conventional MUTEX locks requires that the model object 24 understand how the view object 22 operates. The understanding of how the view object 22 operates is a difficult task which becomes even more difficult when the view object 22 is generated by another person or entity.

FIG. 2B is a diagram illustrating an operating system arrangement 26. The arrangement 26 shown in FIG. 2B includes a distributed object-oriented environment (DOE) server 27 which is coupled between a client (model) 24 and an X_Server 28. The DOE server 27 implements the view object 22. The X_Server 28 manages the windowing environment and event distribution. Each call between the client 24 and the DOE server 27 are placed on different threads. Because the DOE server 27 does not have control over the main thread, the conventional approaches are ineffective. Nevertheless, the invention will insure that the threads being produced by the calls of the client process 24 to update the view object 22 are serialized when needed.

FIG. 3 is a diagram illustrating implementation of the invention in an X_Windows system 30. The X_Windows system 30 includes an X_Server 32, a baton event loop 34, objects 36, 38 and 40, and a user 42. The X_Server 32 receives events from the objects 36, 38 and 40 as well as from the user 42, and forwards the events to the baton event loop 34. The baton event loop 34 is a newly created event loop for servicing the X_events and dispatching the events to the objects 36, 38 and 40. The objects 36, 38 and 40 are different objects within the same process that contend for a multithreading unsafe resource. Further, the baton event loop 34 and objects 36, 38 and 40 are within a common process, and the X_Server is a separate process.

Figure 4:
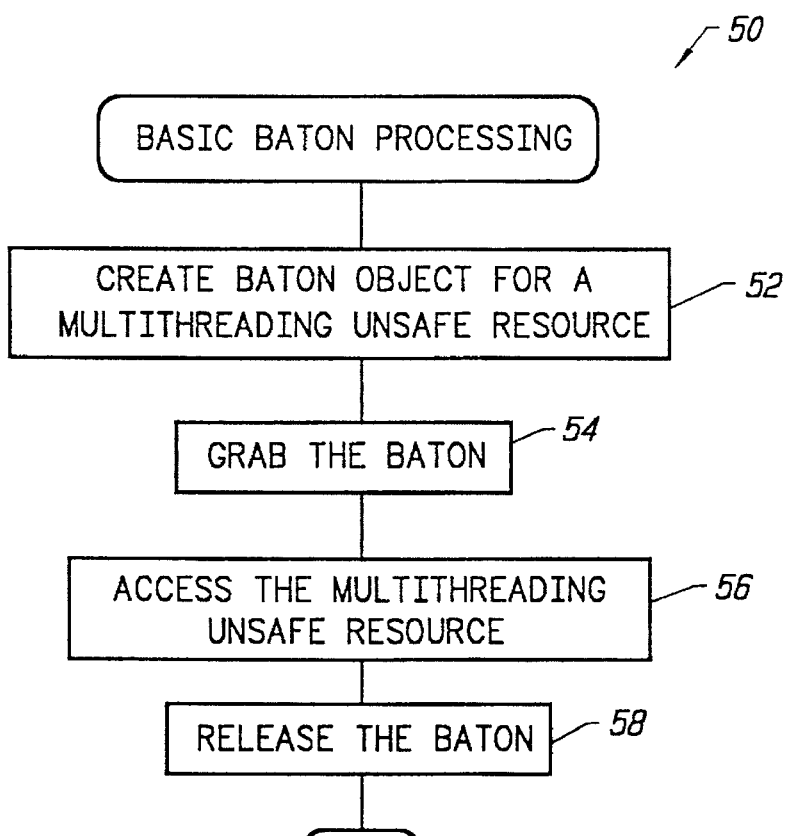
FIG. 4 is a basic flow chart of baton processing associated with the invention.

FIG. 4 is a basic flow chart of baton processing 50 associated with the invention. The baton processing 50 is executed on a computer system and operating system that supports multithreading. The baton processing 50 begins by creating 52 a baton object for a thread requiring access to a multithreading unsafe resource. Next, prior to attempting to access the multithreading unsafe resource, a baton is grabbed 54 by the baton object. Once the baton is grabbed 54, the thread running within the computer system and operating system that is associated with the baton object having the baton is free to access 56 the multithreading unsafe resource. After accessing the multithreading unsafe resource is completed, the baton is released 58 from the baton object. The baton itself is similar to a MUTEX lock, but the management of the baton is achieved using the baton objects which are themselves objects of object-oriented programming. Consequently, the baton processing 50 associated with the invention is able to efficiently serialize access to the multithreading unsafe resource while minimizing the burden on the software developer.

FIGS. 5-12 are flow charts illustrating an embodiment of the invention for an arrangement such as illustrated in FIG. 2A. Namely, the arrangement is the GUI process arrangement 20 that includes the view object 22 and the model object 24 as shown in FIG. 2A. The embodiment described in FIGS. 5-12 is also described in the context of an X_Windows environment such as shown in FIG. 3.

Generally speaking, multiple threads compete for access to the multithreading unsafe resource. Each time a thread seeks access to the multithreading unsafe resource, a baton object is created. Although there may be numerous baton objects, at any given point in time, at o most one of the baton objects can hold the baton. Hence, each baton object is an instance so that the various baton objects can be distinguished from one another. Of the various threads seeking to access the multithreading unsafe resource, only the thread corresponding to the baton object that holds or owns the baton is permitted to access the multithreading unsafe resource.

Figure 5:
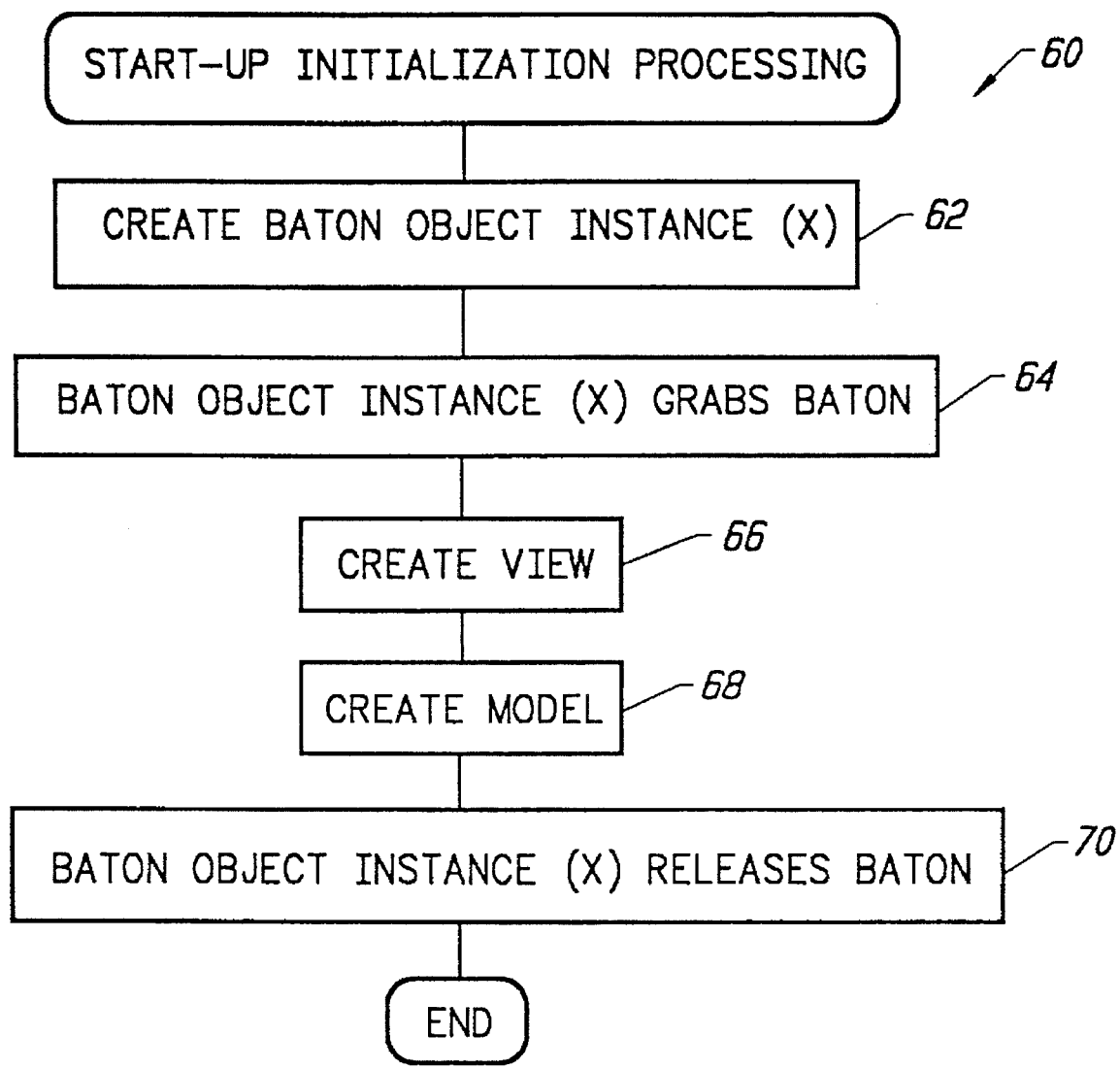
FIG. 5 is a flow chart of start-up initialization processing for use with the arrangement shown in FIG. 2A.

FIG. 5 is a flow chart of start-up initialization processing 60 for use with the arrangement 20 shown in FIG. 2A. The start-up initialization processing 60 is preferably executed in its own thread. The start-up initialization processing 60 first creates 62 baton object instance (x), and then the baton instance (x) grabs 64 the baton for the multithreading unsafe resource to be accessed. The baton is needed for the start-up processing 60 because the start-up processing uses the view (e.g., MOTIF) which is multithreading unsafe. The creating 62 of the baton object and the grabbing 64 of he baton are discussed in detail below with respect to FIGS. 7 and 8.

Next, the start-up initialization processing 60 creates 66 a view, and then creates 68 a model. The view and the model are separate objects which are associated with the arrangement 20 shown in FIG. 2A. The creation 66 of the view is discussed in detail below, while the creation 68 of the model is not discussed below because its creation is very similar to that of the view and otherwise known to those skilled in the art. After creation of the view and the model, the baton is released 70 by the baton object instance (x) and the start-up initialization processing 60 is completed. Usually, once a baton object instance releases the baton, the baton object instance can be destroyed because it is no longer needed. The releasing 70 of the baton is discussed in detail below with respect to FIG. 9.

Figure 6:
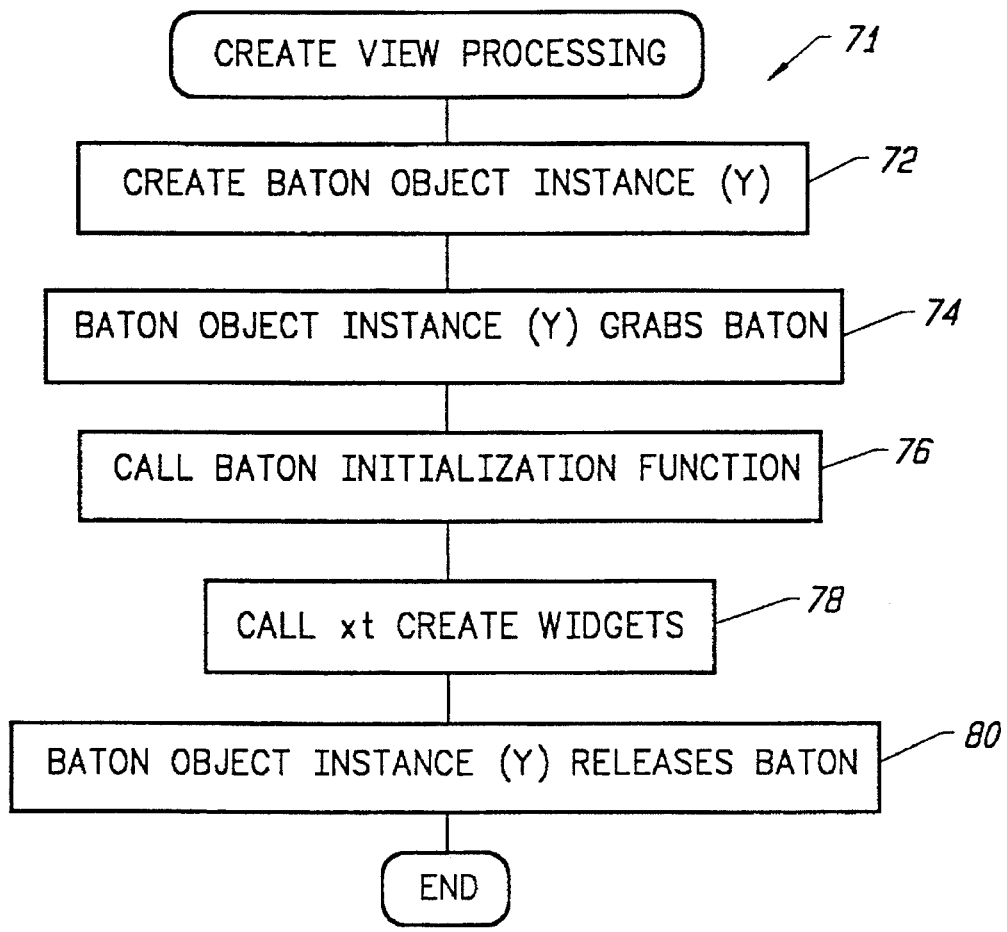
FIG. 6 is a flow chart illustrating create view processing.

FIG. 6 is a flow chart illustrating create view processing 71 associated with the view creation 66 shown in FIG. 5. The create view processing 71 initially creates 72 baton object instance (y), and then the object instance (y) grabs 74 the baton. Again, the creating 72 of the baton object and the grabbing 74 of the baton are discussed in detail below with respect to FIGS. 7 and 8. Next, the create view processing 71 calls 76 a baton initialization function to perform various initialization processing for the baton object. Then, XT create widgets is called 78. The call 78 to XT create widgets is a call associated with X_Windows to create GUI components as is well known in the art. The baton object instance (y) is necessary because the calls 76 and 78 to the baton initialization function and XT create widgets are multithreading unsafe. Thereafter, the baton is released 80 by the baton object instance (y) and the create view processing 71 is completed. Note, that in the normal case, where the start-up initialization processing 60 and the create view processing 71 are on executed in the same thread of execution, the create view processing 71 would not need to seek the baton because the start-up initialization processing 60 would already hold the baton. Nevertheless, by always seeking the baton within every function or module using the multithreading unsafe resource, programming errors are minimized. Also, the processing performed to grab the baton is intelligent enough to distinguish whether the baton is actually needed so that the processing can be completed very rapidly when not needed.

Figure 7:
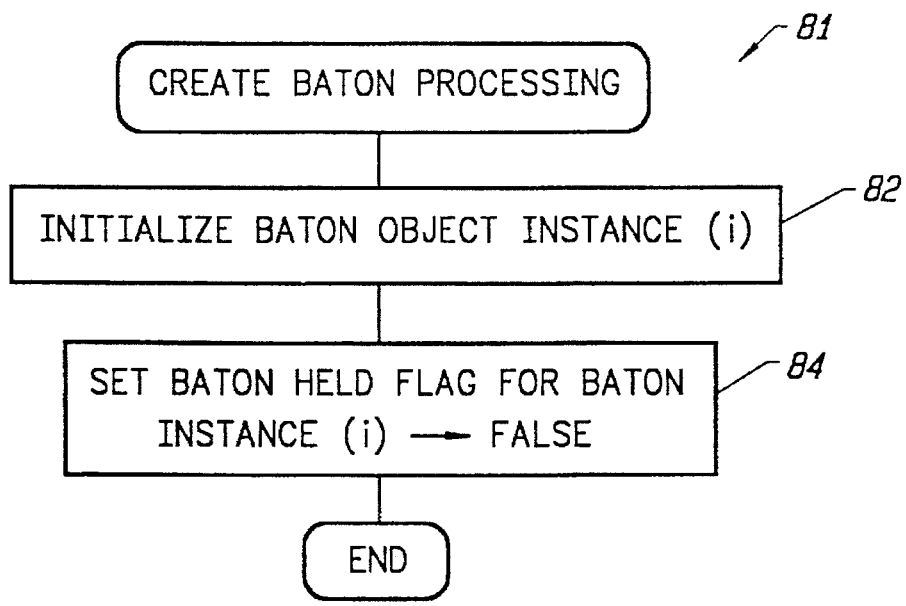
FIG. 7 is a flow chart illustrating create baton processing.

FIG. 7 is a flow chart illustrating create baton processing 81 associated with blocks 62 and 72 (as well as block 124 discussed below). The create baton processing 81 creates the baton objects for the different threads. Again, each of the baton objects is a different instance so they are distinguishable. The baton objects eventually compete for access to a multithreading unsafe resource. In creating each of the baton objects, the create baton processing 81 initializes 82 baton object instance (i), where "i" represents the particular instance such as (x) or (y) discussed above. When the programming environment is C++, the default constructor provided with C++ is preferably used to create the baton objects on the stack. Next, a baton held flag for the baton instance (i) is set 84 to FALSE. The baton held flag for the baton instance (i) indicates whether or not baton object instance (i) holds the baton. When the baton held flag for baton instance (i) is set to TRUE, baton object instance (i) holds the baton. When the baton held flag for baton instance (i) is set to FALSE, baton object instance (i) does not hold the baton. This completes the create baton processing 81.

Figure 8:
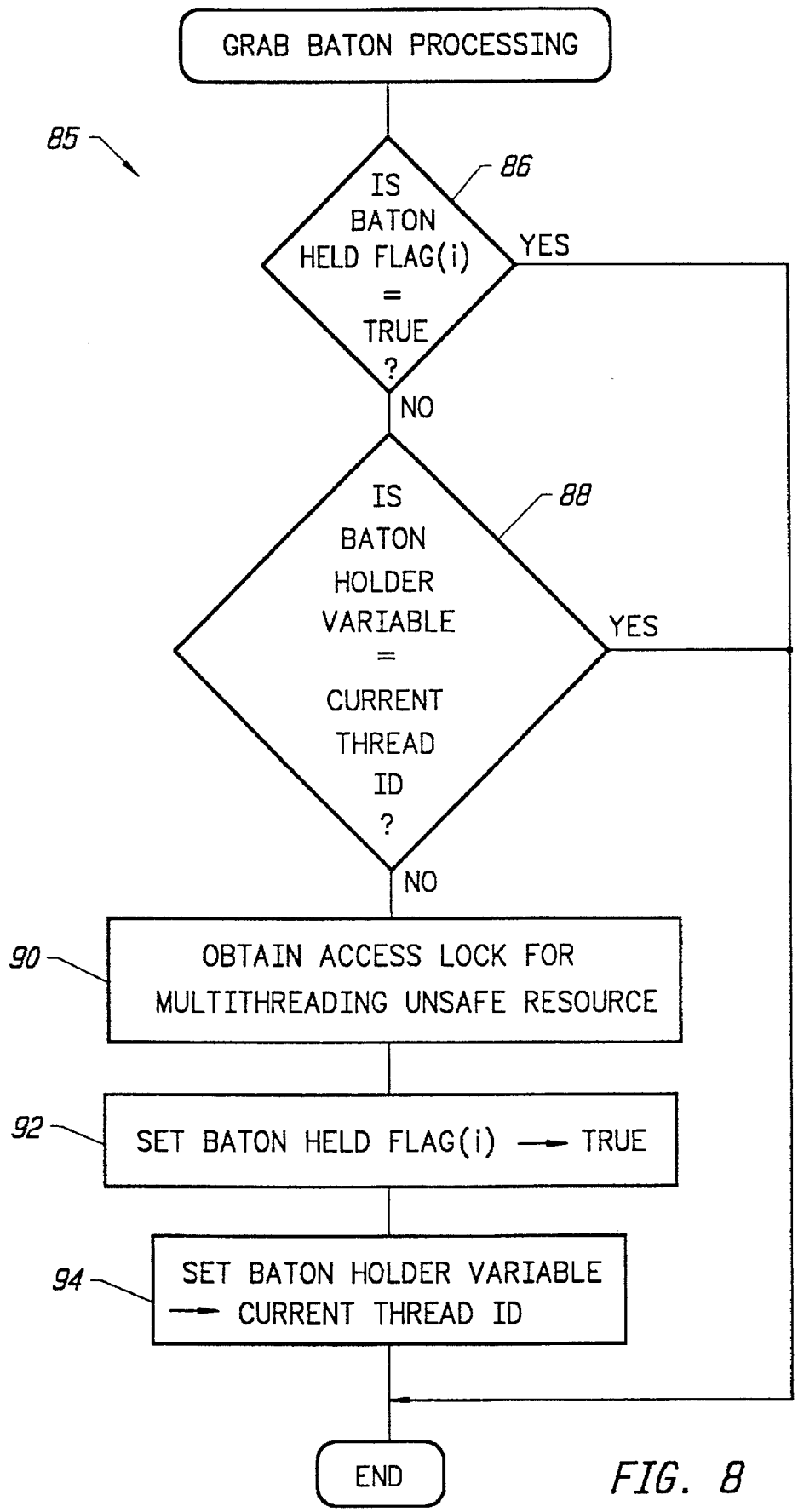
FIG. 8 is a flow chart illustrating grab baton processing.

FIG. 8 is a flow chart illustrating grab baton processing 85 associated with blocks 64 and 74 (as well as block 126 discussed below). The grab baton processing 85 begins with a decision 86 based on the status of a baton held flag. If the particular instance (i) of the baton object seeking to "grab" the baton is determined 86 to already own the baton object, then the baton need not be grabbed again. Namely, if the baton held flag for baton object instance (i) is TRUE, then the decision block 86 causes the grab baton processing 85 to return immediately. Hence, in the case where the programmer or software developer inadvertently seeks to obtain the baton for a particular multithreading unsafe resource when the baton is already held by that baton object instance, deadlock or erroneous execution will not result due to the programming error, but instead the grab baton processing 85 efficiently detects that the baton object instance seeking the baton already owns it, thereby overlooking such programming errors.

However, in a case where the baton held flag for instance (i) is FALSE, then the grab baton processing 85 continues to a decision block 88. The decision block 88 determines whether the baton holder variable is equal to a current thread identifier (ID). That is, the decision block 88 determines whether the baton is currently held by the thread seeking to now grab the baton. If it is, the grab baton processing 85 returns (i.e., completes) without the need for any additional processing. On the other hand, if the thread seeking the baton does not currently hold the baton, additional processing is carried out. Specifically, the grab baton processing 85 next seeks to obtain 90 an access lock for the multithreading unsafe resource. This access lock is, for example, a MUTEX lock wherein the grab baton processing 85 will wait and block 90 until the access lock can be obtained for this particular thread running the grab baton processing 85. Once the access lock is obtained 90, the baton held flag for this instance (i) is set 92 to TRUE. Additionally, the baton holder variable is set 94 to the current thread identifier (ID) so that the variable is updated with the thread identifier of the current baton holder.

Figure 9:
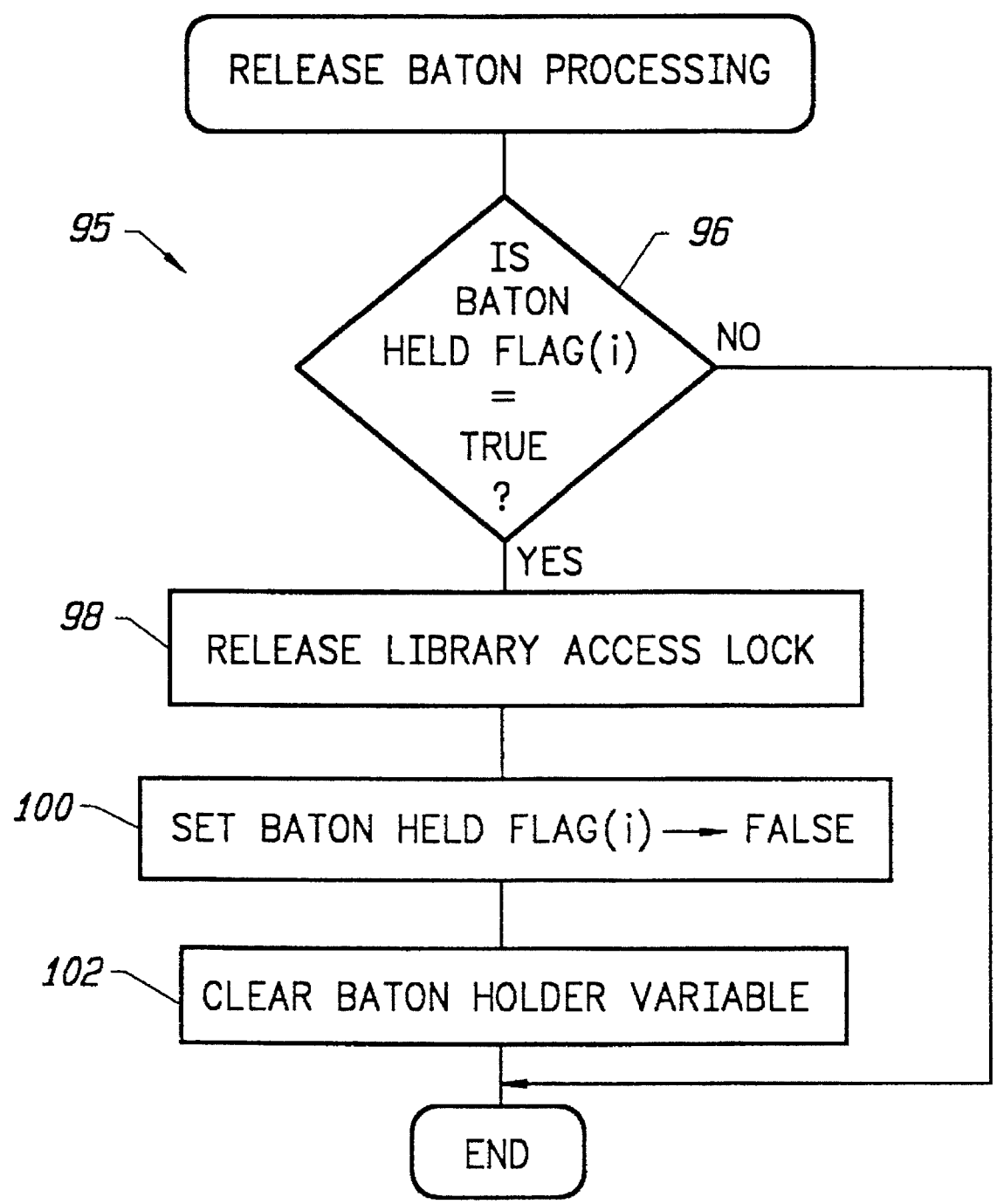
FIG. 9 is a flow chart illustrating release baton processing.

FIG. 9 is a flow chart of release baton processing 95 associated with blocks 70 and 80 (as well as block 134 discussed below). The release baton processing 95 begins with a decision block 96. The decision block 96 determines whether the baton held flag for instance (i) is TRUE. If the decision block 96 indicates that the baton held flag for instance (i) is FALSE, then the release baton processing 95 returns immediately because there is no need to actually release the baton because this particular baton object instance does not hold it. When the baton held flag for instance (i) is FALSE, the request to release the baton for the instance was a program error. Even so, the program error is not harmful to program execution because the release baton processing 95 essentially ignores it and avoids any unnecessary processing. Hence, the decision block 96 masks programming errors much the same way that decision block 86 in FIG. 8 does. On the other hand, if the baton held flag for instance (i) is TRUE, then the access lock previously obtained by the baton object instance (i), is now released 98. The baton held flag for instance (i) is now set 100 to FALSE because it no longer holds or owns the baton. Finally, the baton holder variable, which indicates the current thread identifier (ID) of the thread holding the baton, is now cleared 102.

Preferably, the release baton processing 95 is done automatically. Namely, when the programming environment is C++, the baton objects are C++ stack-based objects, and all returns from stack-based objects automatically execute the C++ class destructor which destroys the object. The release baton processing 95 can be achieved automatically by modifying the C++ class destructor so as to carry out the release baton processing 95 operations. Even so, for optimization reasons, the programmer may want to activate the release baton processing 95 before the baton object is destroyed.

Figure 10:
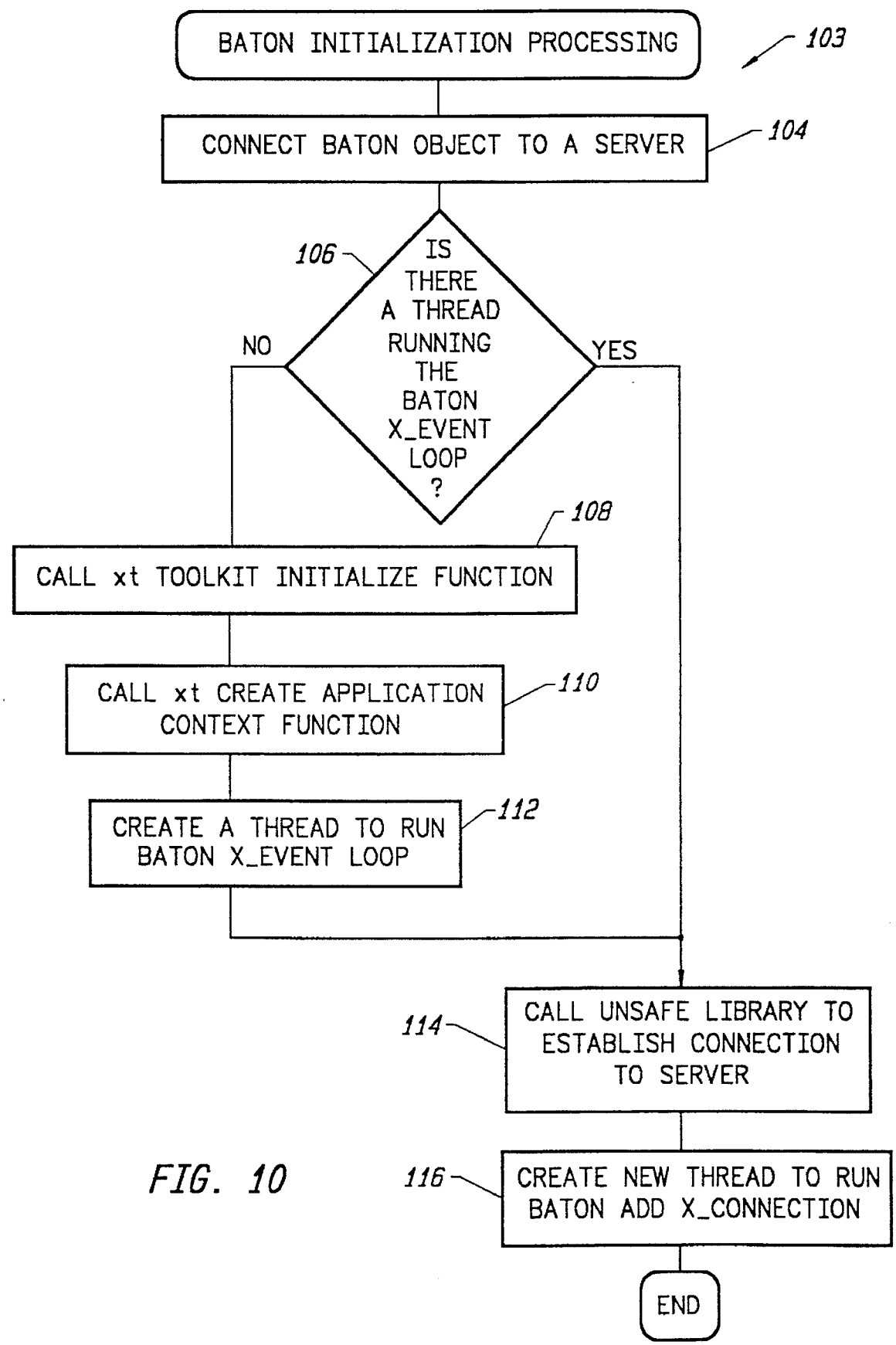
FIG. 10 is a flow chart illustrating baton initialization processing.

FIG. 10 is a flow chart of the baton initialization processing 103 associated with the baton initialization function call 76. The baton initialization processing 103 begins by connecting 104 the baton object to a server. The server is, for example, an X_Server. Next, a decision block 106 determines whether there is a thread running the baton X_event loop. If there is no thread currently running the baton X_event loop, the XT toolkit initialize function is called 108. Next, XT create application context function is called 110. The XT toolkit initialize function and the XT create application context function are X_Windows functions which are well known to those skilled in the art. Then, a thread to run the baton X_event loop is created 112. The thread created 112 to run the baton X_event loop is discussed in greater detail below with regard to FIG. 12. Following block 112, or following block 106 in the case where there was a thread running the baton X_event loop, a call 114 is made to the unsafe resource to establish connection to the server. Thereafter, a new thread to run baton add X_connection is created 116.

Although block 112 creates a thread for the X_event loop in this embodiment, this is not necessary in all cases. The X_event loop is provided to improve throughput and prevent deadlocking while still providing sate access.

Figure 11:
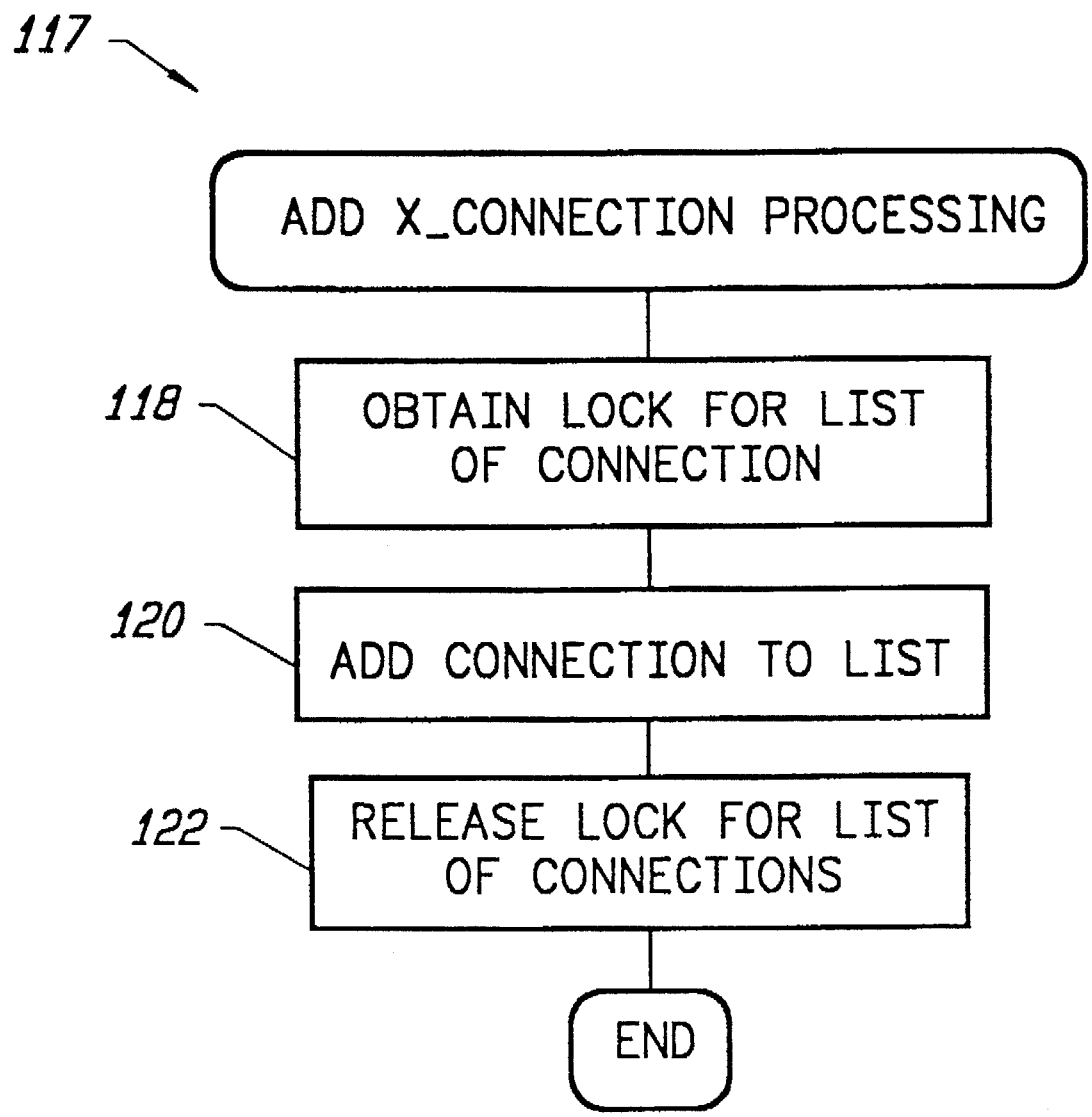
FIG. 11 is a flow chart illustrating add X_connection processing.

FIG. 11 is a flow chart illustrating the add X_connection processing 117 associated with block 116 of FIG. 10. The add X_connection processing 117 first obtains 118 a lock for a list of connections. Next, the new connection is added 120 to the list. Thereafter, the lock for the list of connections is released 122. The lock for the list of connections is MUTEX lock, but it is a different MUTEX lock than the access lock. The list of connections is maintained for use by a poll command discussed below.

Figure 12:
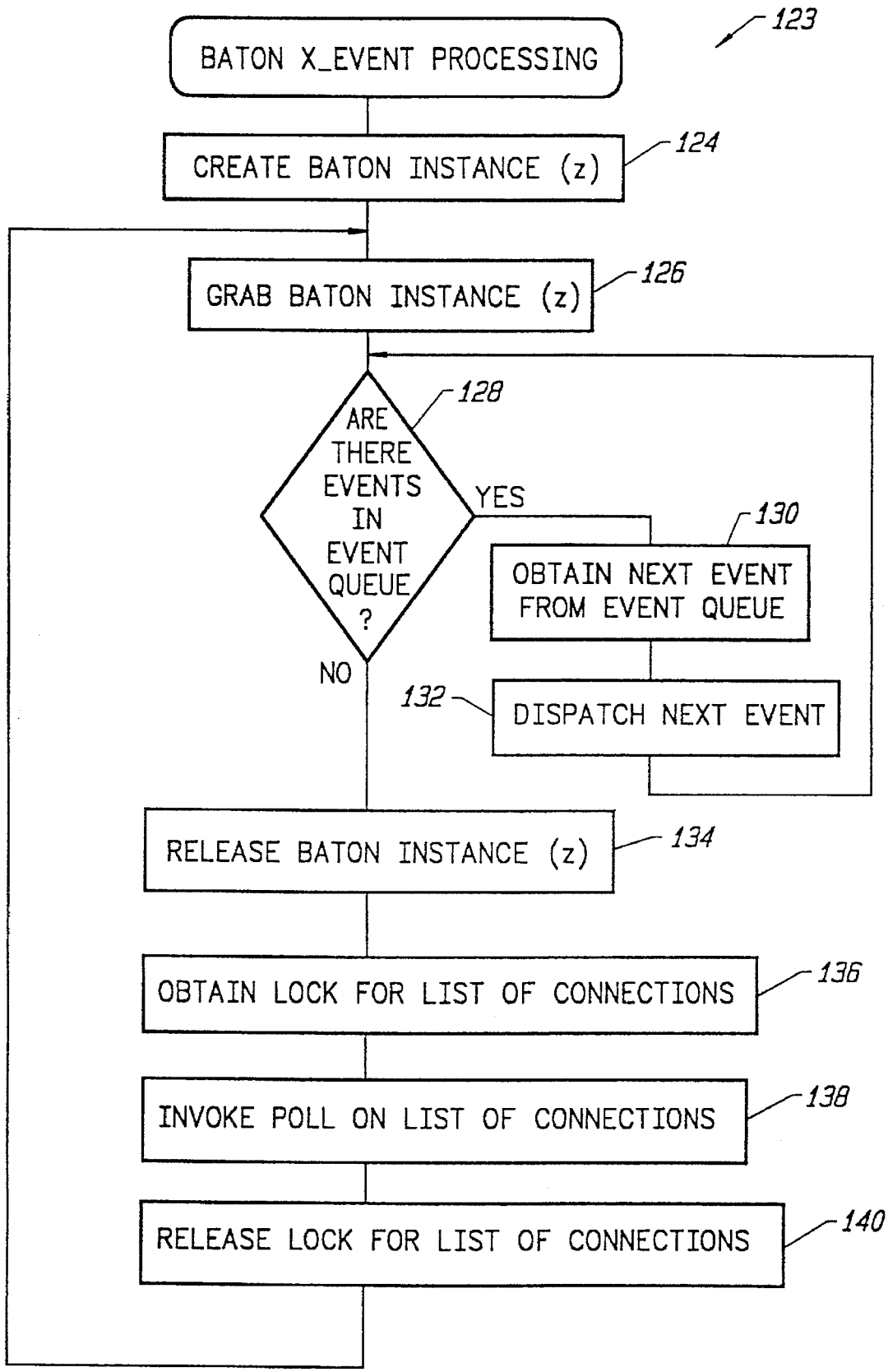
FIG. 12 is a flow chart illustrating baton X_event processing.

FIG. 12 is a block diagram illustrating the baton X_event processing 123 associated with block 112 of FIG. 10. The baton X_event processing 123 is an X_event loop which is utilized instead of the traditional X_event loop associated with an X_Server for the reasons mentioned above. Initially, a baton instance (z) is created 124 and the baton is grabbed 126 by the baton instance (z). The baton is needed for the baton X_event processing 123 because it is itself multithreading unsafe. Next, a decision block 128 determines whether there are any events in an event queue. If there are events in the event queue, a next event from the event queue is obtained 130. Next, the next event which was obtained 130, is dispatched 132. Following block 132, processing returns to decision 128. When decision block 128 determines that there are no events in the event queue, the baton is released 134 by baton object instance (z). Here, in the C++ environment, the release 134 of the baton would be explicitly called as the X_event loop is not destroyed.

Next, the lock for the list of connections is obtained 136. This lock is, for example, a MUTEX lock and is the same lock discussed with respect to FIG. 11. Once the lock for the list of connections is obtained 136, a poll command on the list of connections is invoked 138. The poll command is a command of UNIX which is a system call that connects to the server to listen over the connections for information. Once new information exists on one of the connections, the system call returns. Alternatively, a time-out condition could be set on the poll command so that it is not blocked for an excessively long period of time. Once the poll command returns, the lock for the list of connections is released 140. Since the baton X_event processing 123 is an X_event loop, following block 140, processing returns to block 126 for continued processing.

FIG. 13 is a diagram illustrating pseudo-code for an exemplary case of the X_event loop (FIG. 12)) and the add X_connection processing (FIG. 11). The X_event loop processing is performed in thread #A 142 and the add X_connection processing is performed in thread #B 144. As shown within thread #A, the X_event loop is a loop in which events are obtained and dispatched. Prior to processing events, the baton is grabbed, and then once processing of the events is completed, the baton is released. After the baton is released, a lock for the connection list is obtained. If it is not currently available, the X_event loop would block and wait its availability. Once the list lock is obtained, the connection list is polled in which case the system waits for activity, and once obtained, the list lock is released. Thread #B 144, on the other hand, simply needs to obtain the list lock, add one or more connections to the connection list, and then release the list lock.

Although thread #A and thread #B compete with one another for the list lock (connection_list_lock), deadlock will not result. In the example shown in FIG. 13, thread #B 144 initially would try to obtain the list lock at position 146 shown in FIG. 13. However, because at that time, thread #A 142 was in possession of the list lock, thread #B 144 had to wait until after thread #A 142 released the list lock. Thus, as shown in FIG. 13, the thread #B;144 does not obtain the list lock until position 148.

Although not shown in FIG. 13, in another exemplary case, if thread #B 144 had obtained the list lock prior to the attempt of thread #A 142 to obtain the list lock at position 150, then thread #A 142 would have waited for thread #B 144 to realize the list lock. Although both threads compete for the same lock, deadlock cannot result and neither thread will have to wait for a significant amount of time.

All of the baton instances compete for obtaining a single access lock for each multithreading unsafe resource. The baton objects are objects of object-oriented programming which simplifies the use of the serialization of accessing to multithreading unsafe resources and performs bookkeeping functions in an efficient manner. In the case where there are multiple multithreading unsafe resources, an access lock (such as a MUTEX lock) would be used for each of the multithreading unsafe resources. Further, multiple baton object instances could be issued or activated for each access lock.

Figure 14:
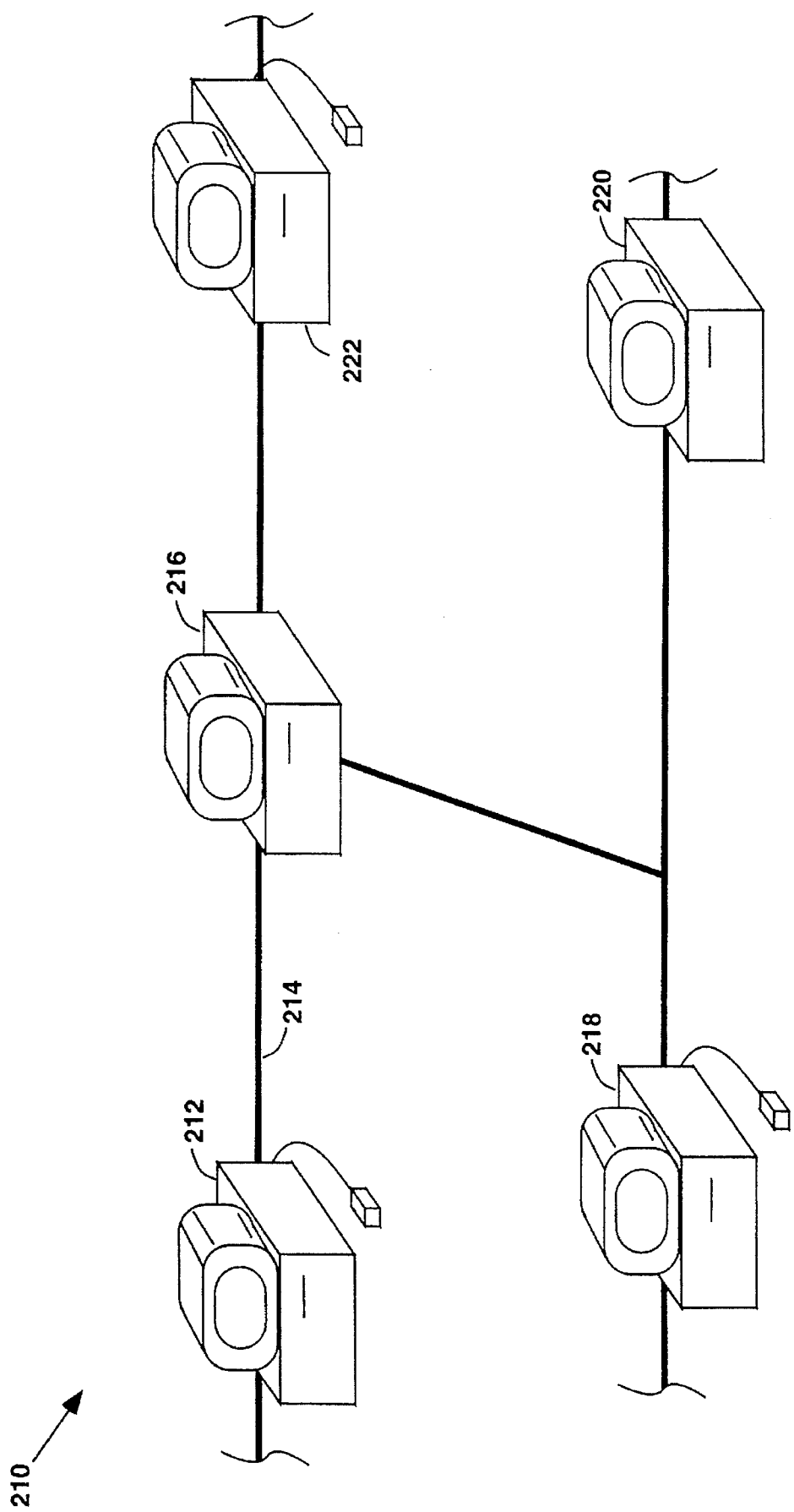
FIG. 14 is a pictorial illustration of various computers linked together in a computer network.
Figure 15:
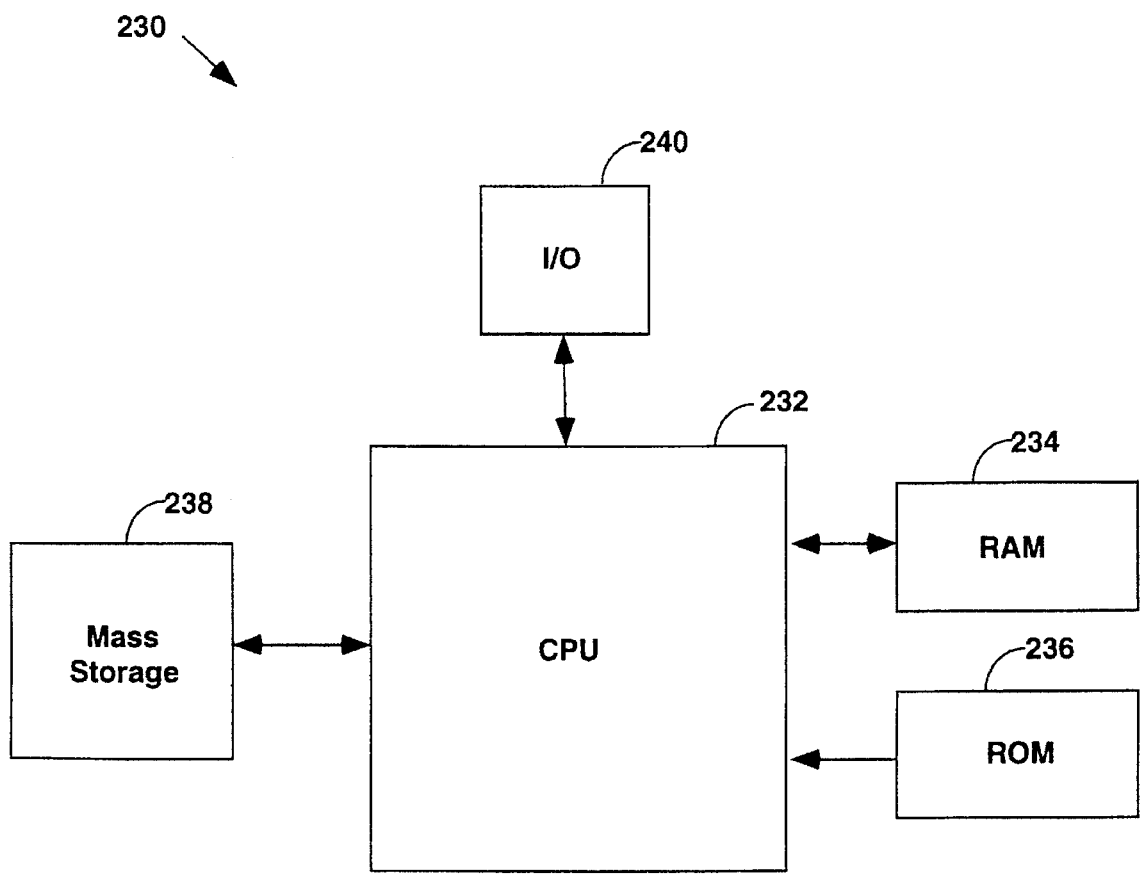
FIG. 15 illustrates diagrammatically some of the major components of one of the computers illustrated in FIG. 14.

In a preferred embodiment of the present invention, objects or threads which make use of the invention execute on one or more computers. If multiple computers are used they are linked together by a network. The network may take any suitable form. By way of example a representative network arrangement 210 is illustrated in FIG. 14. The network arrangement 210 includes a first computer 212 which is coupled to a transmission line 214. The network 210 further includes a server, router or the like 216 in addition to other computers 222, 218, and 220 such that data and instructions can be passed among the networked computers. The design, construction and implementation of computer networks will be familiar to those of skill in the art.

A representative computer 230 suitable for use as computers 212, 218, 220, and 222 of FIG. 1 is illustrated schematically in FIG. 2. Computer 230 includes a central processing unit (CPU) 232 which is coupled bidirectionally with random access memory (RAM) 234 and unidirectionally with read only memory (ROM) 236. The CPU 232 together with an operating system (not shown) operate to execute computer code in a multithreaded manner. The computer code may reside on the RAM 234, the ROM 236, or a mass storage device 238. The computer code could also reside on a portable medium and then loaded or installed onto the computer 230 when needed. Portable mediums include, for example, CD-ROMS, PCMCIA devices, RAM devices, floppy disk, magnetic tape.

Typically, RAM 234 is used as a "scratch pad" memory and includes programming instructions and data, including distributed objects and their associated data and instructions, for processes currently operating on CPU 232. ROM 236 typically includes basic operating instructions, data and objects used by the computer to perform its functions. The mass storage device 238, such as a hard disk, CD ROM, magneto-optical (floptical) drive, tape drive or the like, is coupled bidirectionally with CPU 232. Mass storage device 238 generally includes additional programming instructions, data and objects that typically are not in active use by the CPU, although the address space may be accessed by the CPU, e.g., for virtual memory or the like. Each of the above described computers further includes an input/output source 240 that typically includes input media such as a keyboard, pointer devices (e.g., a mouse or stylus) and/or network connections. Additional mass storage devices (not shown) may also be connected to CPU 232 through a network connection. It will be appreciated by those skilled in the art that the above described hardware and software elements, as well as networking devices are of standard design and construction, and will be well familiar to those skilled in the art.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for synchronizing multithreaded processes within a multitasking computer system so that multiple threads can safely access a multithreading unsafe resource, said method comprising the computer-implemented steps of:
   (a) creating a baton object for each thread that desires access to a multithreading unsafe resource, each of the baton objects contending for a baton associated with the multithreading unsafe resource, wherein the multithreading unsafe resource may only be accessed by a particular thread when such thread's associated baton object holds the baton;
   (b) causing a first one of the baton objects to hold the baton before the thread associated with the first baton object is permitted to access the multithreading unsafe resource;
   (c) subsequent to said causing step (b), permitting the thread associated with the first baton object to access the multithreading unsafe resource; and
   (d) releasing the baton from the baton object once the access by the thread associated with the first baton object is completed,
   whereby when the first baton object holds the baton, other baton objects are prevented from holding the baton and their associated threads are prevented from accessing the multithreading unsafe resource.

2. A method as recited in claim 1, wherein said causing step (b) comprises determining whether the baton for the multithreading unsafe resource is already held by the baton object.

3. A method as recited in claim 1, wherein said causing step (b) comprises determining whether the baton object associated with a current thread holds the baton for the multithreading unsafe resource.

4. A method as recited in claim 1, wherein said causing step (b) comprises:
   (b1) determining whether the baton for the multithreading unsafe resource is already held by the baton object; and
   (b2) determining whether at least one baton object associated with a current thread holds the baton for the multithreading unsafe resource, and
   wherein when neither the baton is already held by the baton object nor the at least one baton object associated with the current thread holds the baton, said causing step (b) further comprises:
   (b3) obtaining an access lock for the multithreading unsafe resource;
   (b4) setting a baton held flag for the baton object to indicate ownership of the baton by the baton object; and
   (b5) storing an identifier for the current thread in a baton holder variable to indicate the thread holding the baton.

5. A method as recited in claim 1, wherein the multithreading unsafe resource comprises a multithreading unsafe algorithm.

6. A method as recited in claim 1, wherein the multithreading unsafe resource comprises a multithreading unsafe library.

7. A method as recited in claim 1, wherein the multithreading unsafe resource comprises a multithreading unsafe function.

8. A computer-implemented method for synchronizing multithreaded processes so that multiple threads can safely access a multithreading unsafe algorithm, said method comprising the computer-implemented steps of:
   (a) creating baton objects for each thread desiring access to a multithreading unsafe algorithm, each of the baton objects contending for a baton associated with the multithreading unsafe algorithm;
   (b) before one of the threads calls the multithreading unsafe algorithm, requiring the baton object associated with the one of the threads to grab the baton associated with the multithreading unsafe algorithm;
   (c) subsequent to said requiring step (b), permitting the thread associated with the baton object holding the baton to call the multithreading unsafe algorithm, wherein the multithreading unsafe algorithm may only be called by a particular thread when such thread's associated baton object holds the baton;
   (d) returning from the multithreading unsafe algorithm; and
   (e) subsequent to said returning step (d), releasing the baton from the baton object that grabbed the baton in step (b); and
   whereby when a particular baton object holds the baton, other baton objects are prevented from holding the baton and the threads associated with the baton object that are prevented from holding the baton are prevented from accessing the multithreading unsafe algorithm.

9. A method as recited in claim 8, wherein said requiring step (b) comprises the step of determining whether the baton for the multithreading unsafe algorithm is already held by the baton object.

10. A method as recited in claim 8, wherein said requiring step (b) comprises the step of determining whether the baton object associated with a current thread holds the baton for the multithreading unsafe algorithm.

11. A method as recited in claim 8, wherein said requiring step (b) comprises the steps of:
   (b1) determining whether the baton for the multithreading unsafe algorithm is already held by the baton object; and
   (b2) determining whether at least one baton object associated with the current thread holds the baton for the multithreading unsafe algorithm, and
   wherein when neither the baton is already held by the baton object nor the at least one baton object associated with the current thread holds the baton, said requiring step (b) further comprises: (b3) obtaining an access lock for the multithreading unsafe algorithm.

12. A method as recited in claim 11, wherein said requiring step (b) further comprises:
- (b4) setting a baton held flag for the baton object to indicate ownership of the baton object; and
- (b5) storing an identifier for the current thread in a baton holder variable to indicate the thread holding the baton.

13. A method as recited in claim 8, wherein the multitasking computer system operates a X_Windows System environment, the X_Windows System environment having an X_Server and a plurality of objects.

14. A method as recited in claim 13, wherein said method further comprises the step of (e) initializing the baton objects for an X_Windows System.

15. A method as recited in claim 13, wherein said method further comprises the step of (e) utilizing a baton event loop to receive incoming event from the X_Server and distribute the events to the objects, wherein the baton event loop executes within one of the threads and one of the baton objects is associated therewith.

16. A method as recited in claim 8, wherein the multitasking computer system operates a windows system environment, the windows system environment having a server and a plurality of objects, and
wherein said method further comprises the step of (e) utilizing a baton event loop to receive incoming event from the server and distribute the events to the objects, wherein the baton event loop executes within one of the threads and one of the baton objects is associated therewith.

17. A method as recited in claim 16, wherein the baton is held by the baton object associated with the baton event loop only during a critical section of the baton event loop, thereby allowing the baton objects associated with other of the threads to grab the baton without deadlock or substantial delay.

18. A method as recited in claim 16, wherein said method further comprises: (f) maintaining a list of connections, and wherein said utilizing step (e) comprises the steps of:
- obtaining the baton by the baton object associated with the thread executing the baton event loop;
- distributing the incoming events which have been received;
- releasing the baton by the baton object associated with the thread executing the baton event loop;
- blocking the thread executing the baton event loop; and
- using a poll command on the list of connections to wake-up the thread executing the baton event loop when information is present for one of the connections within the list of connections.

19. An apparatus for serializing access to a multithreading unsafe resource, said apparatus comprising:
- executable computer code including access requests to the multithreading unsafe resource;
- a computer system and an operating system which both support multithreading, said computer system in conjunction with said operating system being arranged to execute said executable computer code in a multithreaded manner; and
- a baton manager, operatively connected to said computer system and said operating system and the multithreading unsafe resource, for serializing access of the multithreading unsafe resource by said computer system and said operating system during the execution of said executable computer code so that at any given point in time only a single thread accesses the multithreading unsafe resource, wherein said baton manager uses at least one baton object to manage ownership of a mutually exclusive lock, the baton objects being associated with at most one thread and the mutually exclusive lock being arranged to insure that the accesses to the multithreading unsafe resource are serialized.

20. An apparatus as recited in claim 19, wherein said baton manager manages multiple baton objects for the multithreading unsafe resource, with at most only one of the baton objects associated with the multithreading unsafe resource owning the mutually exclusive lock during execution of said executable computer code.

21. An apparatus as recited in claim 19, wherein said apparatus serializing access to a plurality of multithreading unsafe resources,
wherein said baton manager includes a mutually exclusive lock for each of the multithreading unsafe resources, and
wherein said baton manager manages multiple baton objects for each of the multithreading unsafe resources, with at most only one of the baton objects associated with each of the multithreading unsafe resources owning the mutually exclusive lock corresponding thereto during execution of said executable computer code.

22. A computer program product, comprising:
a computer usable medium having computer readable code embodied therein for serializing access to multithreading unsafe resources, and wherein said computer readable code comprises:
first computer readable program code devices configured to cause a computer to effect creating a baton object associated with at most one thread, the baton object being configured to facilitate accessing a multithreading unsafe resource wherein the multithreading unsafe resource may only be accessed by the thread associated with the baton object when the baton object holds the baton;
second computer readable program code devices configured to cause a computer to effect grabbing a baton by the baton object before accessing the multithreading unsafe resource;
third computer readable program code devices configured to cause a computer to effect accessing the multithreading unsafe resource; and
fourth computer readable program code devices configured to cause a computer to effect releasing the baton from the baton object after the accessing of the multithreading unsafe resource is complete; and
whereby when the baton object holds the baton, threads not associated with the baton object are prevented from accessing the multithreading unsafe resource.

23. A computer program product as recited in claim 22, wherein said second computer readable program code devices comprises:
fifth computer readable program code devices to determine whether the baton object associated with the current thread holds the baton for the multithreading unsafe resource; and
sixth computer readable program code devices to obtain an access lock for the multithreading unsafe resource.

24. A method as recited in claim 1, further comprising the step of destroying the baton object subsequent to release of the baton from the baton object.

25. A method as recited in claim 8, further comprising the step of destroying the baton object subsequent to release of the baton from the baton object.

26. An apparatus as recited in claim 19, wherein each baton object is configured such that it is associated with only a single thread.

27. A computer program product as recited in claim 22, wherein said computer readable code further comprises seventh computer readable program code devices configured to destroy the baton object after the accessing of the multithreading unsafe resource is complete.

* * * * *